United States Patent [19]

Dahlquist

[11] Patent Number: 4,723,713
[45] Date of Patent: Feb. 9, 1988

[54] INDUSTRIAL ROBOT

[75] Inventor: Håkan Dahlquist, Västerås, Sweden

[73] Assignee: ASEA Aktiebolag, Västerås, Sweden

[21] Appl. No.: 880,175

[22] Filed: Jun. 30, 1986

[30] Foreign Application Priority Data

Jul. 3, 1985 [SE] Sweden ................................ 8503313

[51] Int. Cl.$^4$ ............................................ B05B 15/08
[52] U.S. Cl. .......................................... 239/587; 901/43
[58] Field of Search ................... 901/43, 41; 239/587, 239/754

[56] References Cited

U.S. PATENT DOCUMENTS

| | | | |
|---|---|---|---|
| 3,527,268 | 9/1970 | Ginsburgh | 901/41 |
| 3,880,359 | 4/1975 | Novy | 239/587 |
| 4,305,028 | 12/1981 | Kostas et al. | 901/43 |
| 4,630,567 | 12/1986 | Bambousek | 901/43 |

FOREIGN PATENT DOCUMENTS 2120202 11/1983 United Kingdom .
2147877 5/1985 United Kingdom .

OTHER PUBLICATIONS

The Industrial Robot, vol. 12, No. 2, Jun. '85, pp. 82 to 85.

Primary Examiner—Peter A. Aschenbrenner
Assistant Examiner—Gerald A. Anderson
Attorney, Agent, or Firm—Watson, Cole, Grindle & Watson

[57] ABSTRACT

When using an industrial robot together with a tool which is fed by a fluid, for example a nozzle for water jet cutting, the feed conduits often restrict the orientation capacity of the robot. This is avoided by providing a conduit which extends inside the robot arm and the wrist and comprises swivels, so that the parts of the wrist are able to rotate relative to each other unobstructed by the conduit.

6 Claims, 4 Drawing Figures

INDUSTRIAL ROBOT

TECHNICAL FIELD

The present invention relates to an industrial robot comprising a wrist fixed to an arm and having a plurality of hollow rotatable parts which are arranged in series with each other. The wrist comprises a first part which is rotatable about a first axis, a second part which is journalled in the first part and rotatable about a second axis intersecting the first axis, and a third part which is journalled in the second part and rotatable about a third axis intersecting the longitudinal axis of the third part. The third part supports a tool attachment, which is rotatable about the longitudinal axis of the third part.

The robot is primarily intended for high pressure water jet cutting.

BACKGROUND ART

A robot wrist of the above-mentioned type is previously known from UK Patent Publication No. GB-A-2 147 877 and is characterized by a great orientation capacity. When using such a robot for water jet cutting, however, it has not been possible to utilize this orientation capacity in full, since the conduits leading to the water jet nozzle in certain positions restrict the freedom of movement of the robot wrist.

From UK Patent Publication No. GB-A-2 120 202 it is known to introduce, from above, a bellows-type conduit in a two-axis, hollow wrist of an industrial robot of a different type. However, this known conduit does not solve the problem mentioned above, since this conduit restricts the rotation of the nozzle around a horizontal axis to about 180°.

From the magazine The Industrial Robot, Vol. 12, No. 2, June 1985, pp. 82-85, an industrial robot intended for water jet cutting is previously known. In this robot, the high-pressure water is supplied via a flexible hose wound around the robot arm, which is hardly acceptable from the point of view of personal safety.

DISCLOSURE OF THE INVENTION

According to the invention, the above-mentioned problems are solved by the provision of a conduit, preferably for water for water jet cutting, which extends inside the robot arm and the wrist and comprises members rotatably connecting the conduit sections, extending in the respective wrist parts, with each other so that these sections can rotate around said second axis and said third axis, respectively, permitting the wrist parts to be rotated relative to each other unobstructed by the conduit.

The invention results in a slimmer and hence less space-demanding robot arm, which permits also machining of regions on workpieces which are difficult to reach.

Another advantage obtained is that the conduit is positioned in a protected manner inside the robot arm and the wrist and cannot come into contact with the workpiece. In this way the risk of damage to the conduit is reduced.

BRIEF DESCRIPTION OF THE DRAWINGS

To facilitate an understanding of the invention, a detailed description of one embodiment will be given below with reference to the accompanying drawing, wherein.

DESCRIPTION OF THE PREFERRED EMBODIMENT

Figure 1:
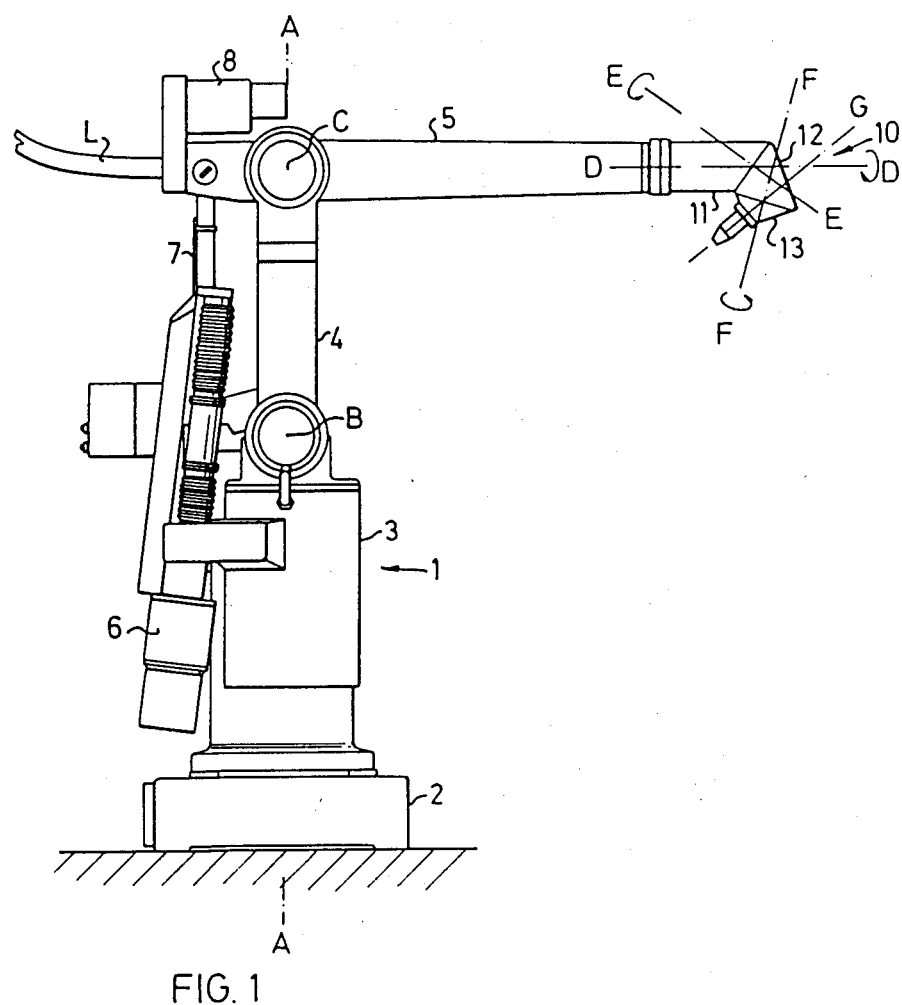
FIG. 1 shows a side view of an industrial robot according to the invention.

In the drawing, 1 designates an industrial robot having six axes—three in the robot itself and three in the wrist. On the robot base plate 2 a pedestal 3 is rotatably journalled about an axis A—A. In this pedestal 3 an inner arm 4 is rotatably journalled about an axis B. An outer arm 5 is rotatably journalled about an axis C in the outer end of the inner arm 4. The pedestal 3 is rotated by means of a drive device arranged in the base plate 2, and the arms 4, 5 are pivotally arranged by means of drive devices 6 and 7, respectively. In the extension of the inner end of the arm 5, a drive device 8 for driving the wrist 10 and a feed conduit 9 for water are arranged.

The wrist 10 is built up of three hollow parts 11, 12, 13, arranged one after the other and being rotatable in relation to each other. The first part 11 is rotatable about an axis D—D, the second part 12 is rotatable about an axis E—E and the third part 13 is rotatable about an axis F—F. The entire wrist 10 constitutes an easily replaceable unit by the fact that its first part 11 can be connected together with a tubular drive shaft 15 on the arm 5.

The wrist part 11 comprises a tubular sleeve 111 having an inner end which is cut off perpendicularly to the axis D—D, said inner end being formed with a threaded flange 112, and an outer end which is cut obliquely at an angle $\alpha$ with an axis perpendicularly to the axis D—D, said outer end being perpendicular to the axis E—E. The wrist 10 is connected together with the drive shaft 15 by threading a threaded ring 113, which makes contact by means of a shoulder surface with the drive shaft 15, onto the flange 112.

A conduit $L_1$ arrives from the arm 5 at the part 11 coaxially with the longitudinal axis D—D and leaves the part 11 coaxially with the axis E—E. The conduit section $L_{11}$ between these coaxial sections has a soft curvature. That section of the conduit $L_1$, which is coaxial with the axis E—E and which leaves the wrist part 11, enters a swivel 124, the axis of rotation of which coincides with the axis E—E. The swivel is fixed to the inner end 122 of the wrist part 12. This part comprises a tubular sleeve 121 having ends 122, 123 obliquely cut at an angle $\alpha$. These ends 122, 123 converge with each other so that in one plane, which passes through the longitudinal axis of the sleeve and the shortest and longest parts of the sleeve, the sleeve has a cross-section which has the shape of a lower part of an equilateral triangle with the top angle $2\alpha$ which is cut off parallel to the base. In the outer, obliquely cut end 123, a swivel 125 is fixed so that the axis of rotation thereof coincides with the axis F—F. Between the two swivels 124, 125, the conduit section $L_{12}$ is rectilinear.

The third part 13 of the wrist 10 also comprises a tubular sleeve 131, the inner end of which is bevel cut at an angle α and the outer end of which is cut perpendicularly in relation to the longitudinal axis G—G. That conduit section $L_{13}$, which connects with the outlet section of the conduit $L_1$ extending along the axis G—G, is curved so that its inner part enters the swivel 125 coaxially with the axis F—F.

Figure 2:
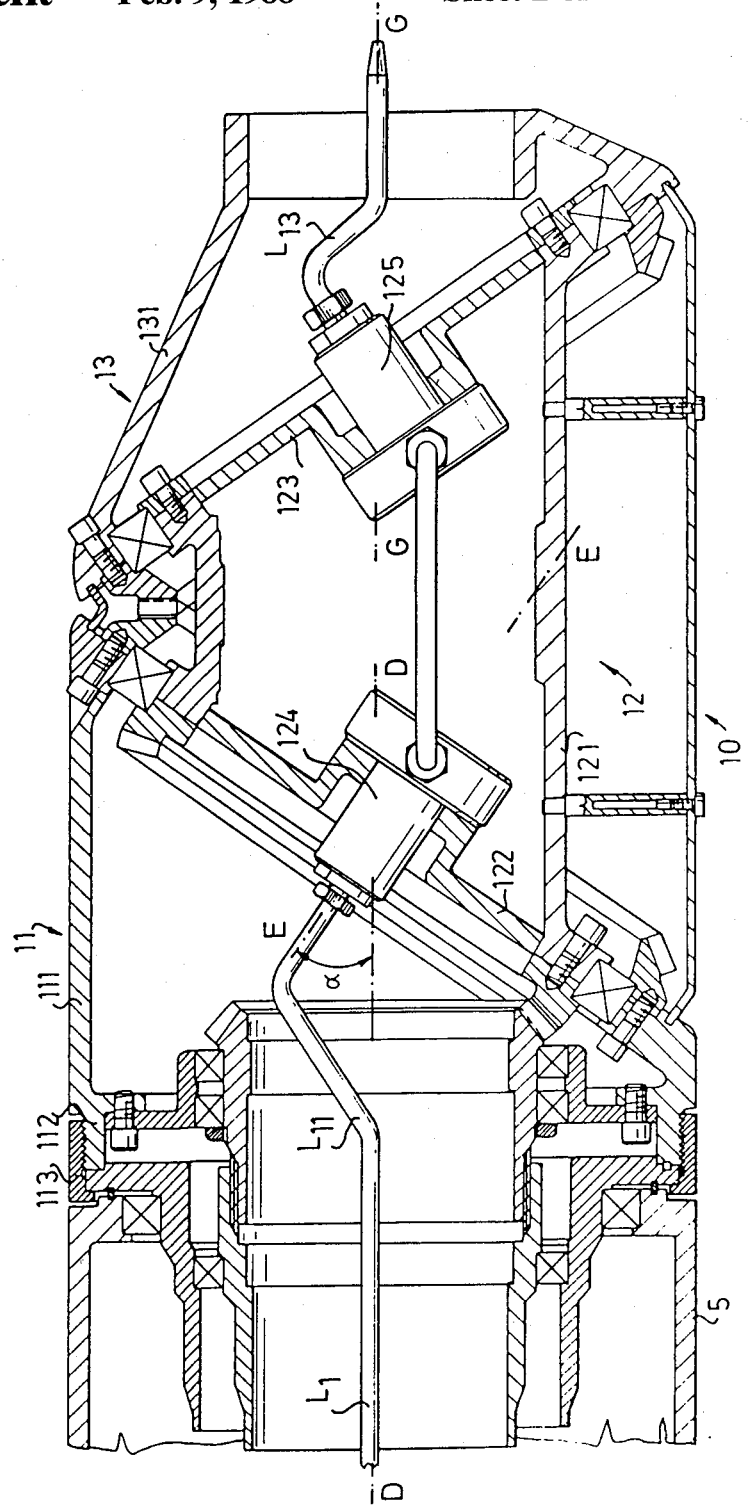
FIGS. 2 and 3 show a cross-section of a wrist which is provided with a conduit according to the invention, the outermost axis of the wrist being oriented so as to coincide with the axis of the outer arm of the robot and making a maximum angle with said arm, respectively.
Figure 3:
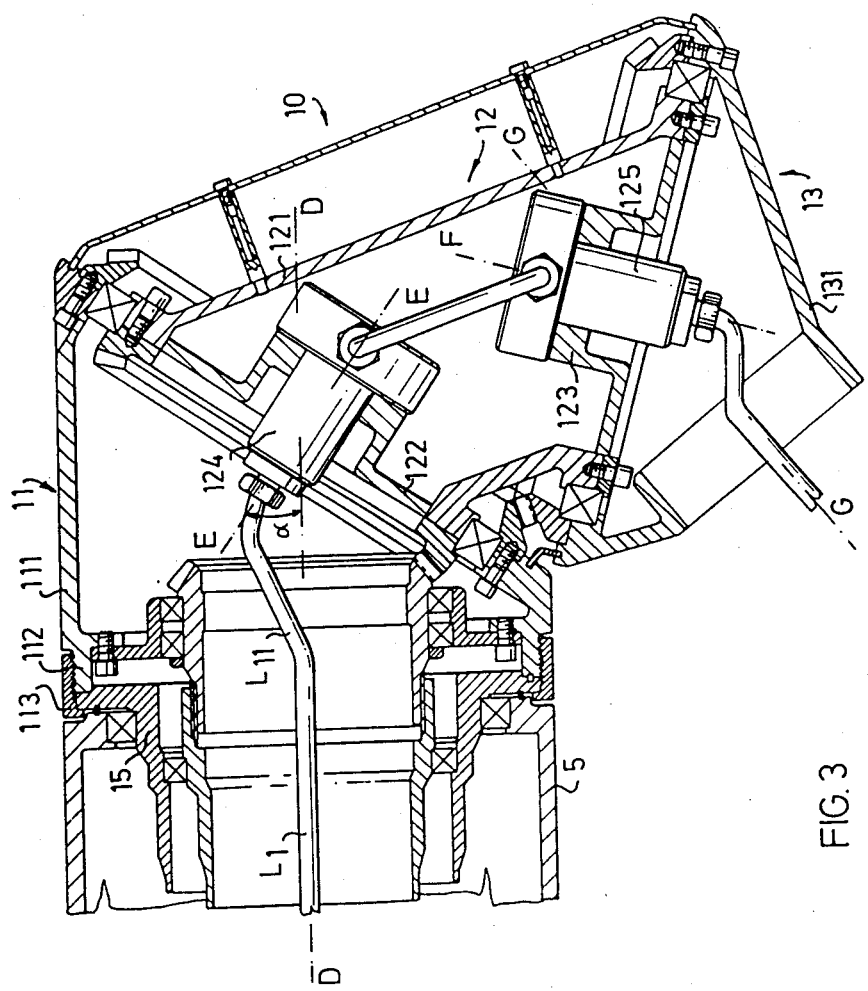

The rotary drive of the three parts of the wrist constitutes no part of the present application and for an understanding of the invention it is sufficient to know that these three parts can be rotated relative to each other from the position shown in FIG. 2 to the position shown in FIG. 3. Otherwise, a detailed description of this rotary drive is given in UK Patent Publication No. GB-A-2 147 877.

Figure 4:
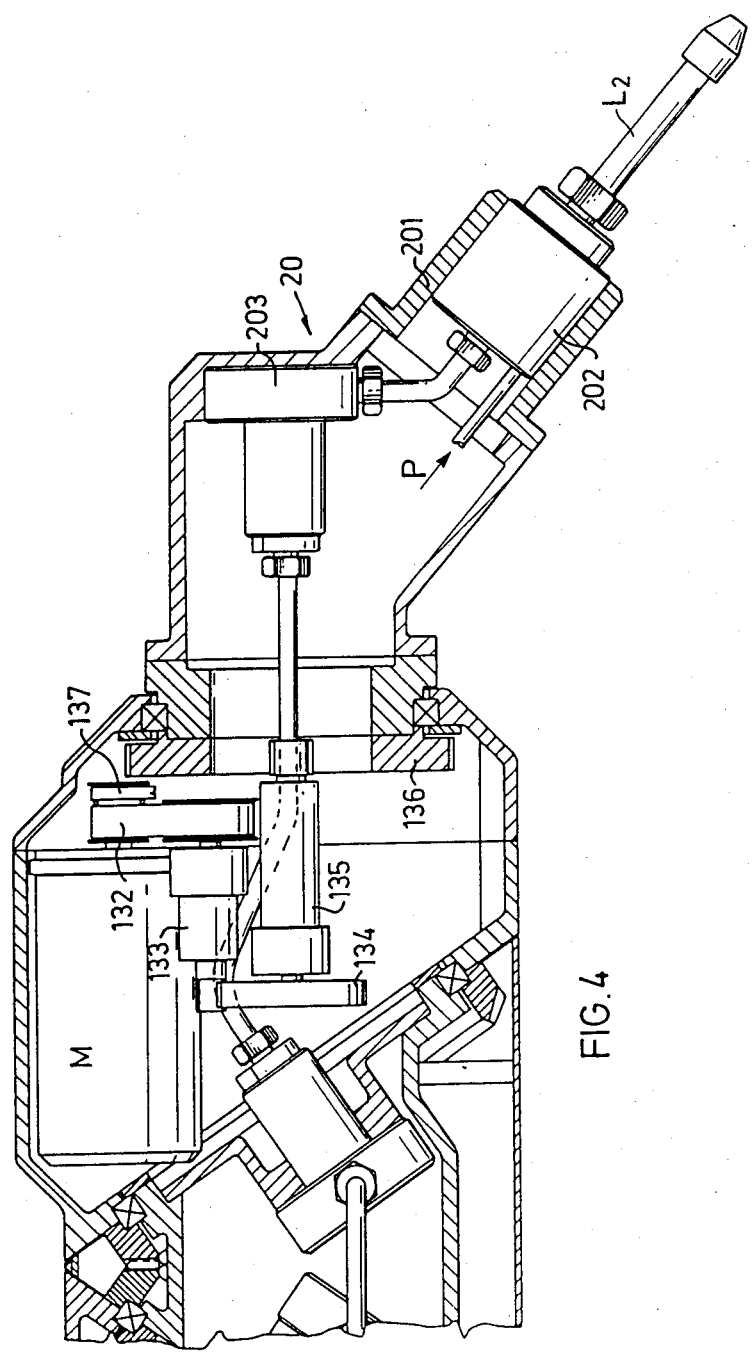
FIG. 4 shows a side view, partially in cross-section, of an embodiment of the third wrist part with a nozzle element fixed thereto.

As shown in FIG. 4, the tool attachment 136 in the preferred embodiment is rotated by means of a motor M arranged in the wrist part 13, said motor M driving the input shaft in a gear unit 133 via a belt 132, the toothed output shaft of said gear unit 133 driving a gear wheel 134 having external teeth. In this connection it should be noted that the gear unit 133 and the gear wheel 134 are not located at the centre of the tube sleeve 131 but are displaced outwards from the mid-plane at such a distance that the gear wheel 134 will not come into contact with the conduit $L_1$. Thus, the belt 132 is directed downwards-outwards from the output shaft of the motor M. A shaft which is fixedly joined to the gear wheel 134 constitutes an input shaft in an additional gear unit 135, the toothed output shaft of which is in mesh with a further toothed part of the tool attachment 136. As indicated in FIG. 4, the output shaft of the motor M is also connected, in a driving manner, to a further belt 137 extending obliquely inwards and away from the mid-plane of the tube sleeve to a control device (not shown), which is designed to deliver a signal, corresponding to the angle of rotation of the tool attachment 136, to the control circuit of the computer-controlled robot. It would, of course, be possible to design the rotary drive of the tool attachment in other ways and the embodiment shown is only given as a non-restricting example.

FIG. 4 also shows a preferred embodiment of a nozzle element 20, which can be fixed to the tool attachment 136. This element 20 has an angularly adjusted outlet port 201 to which an opening and closing valve 202 is fixed. The valve 202 is controlled by a pressure medium, as indicated by the arrow P in FIG. 4. To enable a rotation of the nozzle element 20 around the longitudinal axis G—G for the third wrist part 13, an additional swivel 203, whose axis of rotation coincides with this longitudinal axis, is fixed to the nozzle element 201, which further increases the orientation capacity of the robot. The tube part extending from the swivel 203 is curved so that it enters the valve 202 coaxially with the outlet axis of the element 20. From the valve an outlet conduit $L_2$, with a larger dimension than that of the conduit $L_1$, projects at such a distance outside the nozzle element 20 as is suitable for the machining operation in question. At its outer end the outlet conduit is provided with a nozzle. The mentioned coarser dimension of the conduit $L_2$ is due to the fact that this part is unprotected by the robot arm. Since the high water pressure in the conduits causes the jet from a crack or a rupture on the conduits to involve a risk of fingers and the like being cut off, the conduit $L_2$ has to be dimensioned accordingly.

To enable rotation of the entire wrist 10 in relation to the robot arm 5, that part of the conduit $L_1$ which is coaxial with the axis D—D is inserted into a swivel (not shown) fixed to the robot arm.

Thus, by means of the invention, a conduit is provided which does not limit the orientation capacity of the robot. Furthermore, the protected location of the conduit inside the robot arm and the wrist permits the use of weaker dimensions as compared with an outer conduit location. In addition, this location of the conduit means that the risk of the conduit being damaged through contact with hard objects, upon movement of the robot or its movable parts, is eliminated.

Finally, of course, the conduit can be used for the supply of fluids other than water under pressure.

What is claimed is:

1. An industrial robot comprising a hollow robot arm and a robot wrist mechanism mounted on said robot arm, said robot wrist mechanism including:

a first tubular wrist part which defines a first central axis therethrough and which has a first end and a second end, said first end being mounted on said robot arm so as to be rotatable about said first central axis and said second end having an oblique orientation relative to said first central axis, said first central axis defining a first rotation axis of said robot wrist mechanism, a second tubular wrist part which defines a second central axis therethrough and which has a first end and a second end, each of said first and second ends having an oblique orientation relative to said second central axis, first journal means for mounting the first end of said second tubular wrist part to the second end of said first tubular wrist part and to enable said second tubular wrist part to rotate relative to said first tubular wrist part about a second rotation axis which intersects said first central axis, a third tubular wrist part which defines a third central axis therethrough and which has a first end and a second end, said first end having an oblique orientation relative to said third central axis, second journal means for mounting the first end of said third tubular wrist part to the second end of said second tubular wrist part and to enable said third tubular wrist part to rotate relative to said second tubular wrist part about a third rotation axis which intersects said third central axis, a tool attachment means, a third journal means for mounting said tool attachment means on the second end of said third tubular wrist part and to enable said tool attachment means to rotate relative to said third tubular wrist part about said third central axis, a tubing capable of containing a fluid under high pressure extending within said robot arm and said robot wrist mechanism and comprising a first tubing section in said first wrist part, a second tubing section in said second wrist part, a third tubing section in said third wrist part, a first connection member rotatably connecting said first and second tubing sections so that said second tubing section can rotate about said second rotation axis, and a second connection member rotatably connecting said second and third tubing sections so that said third tubing section can rotate about said third rotation axis, said tubing at said first connection member being coaxial with said second rotation axis, and said second connection member being coaxial with said third rotation axis.

2. The industrial robot according to claim 1, wherein said connection members comprise a first swivel which is fixed to the first end of said second wrist part, and a second swivel which is fixed to the second end of said second wrist part.

3. The industrial robot according to claim 2, wherein said first tubing section comprises a main portion which extends coaxially with said first central axis and is connected by a curved portion to an outlet end portion, which extends coaxially with said second rotation axis and projects from said first swivel, and said third tubing section comprises a main portion which extends coaxially with said third central axis and is connected in a corresponding manner to an inlet end portion which extends coaxially with said third rotation axis, and said second tubing section comprises an inlet end portion connected to said first swivel, an outlet end portion connected to said second swivel and a rectilinear main portion extending between said inlet and outlet end portions.

4. The industrial robot according to claim 1, wherein a nozzle element is fixed to said tool attachment means, said nozzle element having an outlet part which is angularly adjusted relative to said third central axis.

5. The industrial robot according to claim 4, wherein said nozzle element comprises a swivel which enables rotation of said element about said third central axis, and a pressure-medium controlled valve for controlling the fluid through said outlet part.

6. The industrial robot according to claim 1, wherein a swivel is fixed to said robot arm at an inlet end portion of said first tubing section to enable said robot wrist to rotate relative to said robot arm.

* * * * *